United States Patent
Runge et al.

(10) Patent No.: US 12,494,651 B2
(45) Date of Patent: Dec. 9, 2025

(54) METHOD AND STABILIZATION CONTROLLER FOR OPERATING A STAND-ALONE GRID

(71) Applicants: Jörn Runge, Marklohe (DE); Christian Feltes, Dortmund (DE)

(72) Inventors: Jörn Runge, Marklohe (DE); Christian Feltes, Dortmund (DE)

(73) Assignee: RWE Renewables GmbH, Essen (DE)

( * ) Notice: Subject to any disclaimer, the term of this patent is extended or adjusted under 35 U.S.C. 154(b) by 166 days.

(21) Appl. No.: 17/829,474

(22) Filed: Jun. 1, 2022

(65) Prior Publication Data

US 2022/0294229 A1 Sep. 15, 2022

Related U.S. Application Data

(63) Continuation of application No. PCT/EP2020/081599, filed on Nov. 10, 2020.

(30) Foreign Application Priority Data

Dec. 9, 2019 (DE) ...................... 10 2019 133 566.3

(51) Int. Cl.
*H02J 3/38* (2006.01)
*F03D 7/02* (2006.01)
(Continued)

(52) U.S. Cl.
CPC ............ *H02J 3/381* (2013.01); *F03D 7/0284* (2013.01); *F03D 7/048* (2013.01); *H02J 3/241* (2020.01);
(Continued)

(58) Field of Classification Search
CPC .... H02J 3/381; H02J 3/241; H02J 3/32; H02J 2300/28; H02J 2203/10; F03D 7/0284; F03D 7/048
(Continued)

(56) References Cited

U.S. PATENT DOCUMENTS

2008/0084070 A1* 4/2008 Teichmann ........... F03D 7/0284
290/55
2011/0118886 A1 5/2011 Muneshima et al.
(Continued)

FOREIGN PATENT DOCUMENTS

CN 105356505 B 10/2018
DE 3311299 A1 10/1984
(Continued)

OTHER PUBLICATIONS

Erlich et al., "New Control of Wind Turbines Ensuring Stable and Secure Operation Following Islanding of Wind Farms," *IEEE Transactions on Energy Conversion* (Journal), vol. 32, No. 3, pp. 1263-1271, Sep. 2017, doi: 10.1109/TEC.2017.2728703.

*Primary Examiner* — Michael R. Fin
(74) *Attorney, Agent, or Firm* — Reinhart Boerner Van Deuren P.C.

(57) ABSTRACT

Disclosed is a method for operating a stand-alone grid, in which at least one participant of the stand-alone grid is coupled to a stabilization controller and an impedance between an output of the stabilization controller and a grid node of the stand-alone grid is determined. Further, a nominal voltage at the grid node is regulated by means of the stabilization controller depending on the determined impedance.

20 Claims, 3 Drawing Sheets

(51) Int. Cl.
*F03D 7/04* (2006.01)
*H02J 3/24* (2006.01)
*H02J 3/32* (2006.01)

(52) U.S. Cl.
CPC ............. *H02J 3/32* (2013.01); *H02J 2203/10* (2020.01); *H02J 2300/28* (2020.01)

(58) Field of Classification Search
USPC .......................................................... 307/25
See application file for complete search history.

(56) References Cited

U.S. PATENT DOCUMENTS

| | | | |
|---|---|---|---|
| 2012/0261917 A1* | 10/2012 | Egedal | F03D 9/257 |
| | | | 290/44 |
| 2014/0316604 A1 | 10/2014 | Ortjohann et al. | |
| 2015/0042092 A1* | 2/2015 | Nelson | H02M 5/45 |
| | | | 290/44 |
| 2016/0099572 A1* | 4/2016 | Gupta | H02M 3/04 |
| | | | 323/234 |
| 2017/0187188 A1 | 6/2017 | Aubert Guyon et al. | |
| 2017/0250534 A1* | 8/2017 | Yu | H02J 3/18 |
| 2018/0248374 A1 | 8/2018 | Jung et al. | |
| 2019/0181643 A1 | 6/2019 | Chae et al. | |
| 2021/0083505 A1* | 3/2021 | Beaston | H02J 3/381 |
| 2022/0302703 A1* | 9/2022 | Aubert Guyon | H02J 3/32 |

FOREIGN PATENT DOCUMENTS

| | | |
|---|---|---|
| DE | 102014214151 A1 | 1/2016 |
| DE | 102016008666 A1 | 1/2018 |
| EP | 1906505 A1 | 4/2008 |
| EP | 3336998 A1 | 6/2018 |
| WO | WO 2004/027959 A1 | 4/2004 |
| WO | WO 2014/177175 A1 | 11/2014 |
| WO | WO 2018/172441 A1 | 9/2018 |
| WO | WO 2018/172489 A1 | 9/2018 |
| WO | WO 2019/052713 A1 | 3/2019 |

* cited by examiner

METHOD AND STABILIZATION CONTROLLER FOR OPERATING A STAND-ALONE GRID

CROSS-REFERENCE TO RELATED PATENT APPLICATIONS

This patent application is a continuation of International Application No. PCT/EP2020/081599, filed on Nov. 10, 2020, which claims the benefit of priority to German Patent Application No. 10 2019 133 566.3, filed Dec. 9, 2019, the entire teachings and disclosures of both applications are incorporated herein by reference thereto.

FIELD OF THE INVENTION

The subject matter relates to a method for operating a stand-alone grid, in particular a stand-alone grid of a wind farm, in particular an offshore wind farm. Furthermore, the subject matter relates to a stabilization controller, configured to carrying out the method.

BACKGROUND OF THE INVENTION

In the field of wind power plants, but also in other plants with generation equipment, a stable grid frequency and voltage is usually necessary to be able to operate the participants. In particular, the inverters that connect the generation equipment to the utility grid often require an externally imposed grid frequency and grid voltage in order to be able to feed electrical power into the utility grid. In an interconnected system, electrical generators, especially those fed from regenerative sources, can usually only be operated if a stable grid frequency and a stable voltage are provided.

In the case of stand-alone grid operation, however, this is not always the case. Wind power plants usually have their own voltage regulation. If multiple wind power plants are operated together in a stand-alone grid, the voltage regulations of the individual wind power plants may oscillate soaringly, leading to considerable instabilities.

In the event of a blackout, when the utility grid needs to be powered up, it makes sense to first start up the wind power plants together in a network as a stand-alone grid, and then realize a grid connection.

In addition, it is necessary to operate the wind power plants at a minimum power when starting up a wind farm. However, such a power must be dissipated via a load. For an installed capacity of 100 MW, a load be able to absorb about 0-10%, for example, 1 MW of excess power. However, if the wind power plants are not yet connected to a utility grid, such a power dissipation cannot take place. As a result, the wind power plants cannot be put into operation. This is also, as already mentioned, of enormous importance in the case of powering up after a blackout.

During the restart of operation, especially during the first connection of the grid as well as after a grid failure, consumers within the stand-alone grid and/or the wind power plants must be able to be operated. These are, for example, motors, air conditioning systems, control computers and the like. These are supplied by the wind power plants themselves, but do not offer the possibility of additional load absorption, so that a for their supply by the wind power plants as well, a variable load is necessary.

BRIEF SUMMARY OF THE INVENTION

For the above reasons, the subject matter was based on the object of providing a method for operating a participant in a stand-alone grid, in which the stand-alone grid is operated with stable voltage and frequency.

This object is solved by a method and a stabilization controller according to the present claims.

A participant of a stand-alone grid may in particular be a generating plant for electrical power. This may in particular be a plant for generating electrical power from renewable sources. A participant may in particular be a wind power plant (also called a wind energy plant or wind turbine), a photovoltaic plant, a biogas plant, a CHP plant or the like. A participant may be an electrical generator or an electrical load. An electrical generator is, for example, a photovoltaic plant or a wind power plant. In the following, the operation is described with reference to a wind power plant, an analogous application to inverters of other participants is thereby enclosed. A load may be, for example, an equipment of a wind power plant or of a photovoltaic system, or a load in a substation or the like. One or more participants may be operated together in a stand-alone grid.

Within a stand-alone grid, a participant is coupled to a stabilization controller.

A stand-alone grid is in particular such an electrical network in which a plurality of participant are interconnected among themselves, but beyond that are not connected to a (supra-regional) power supply network. A stand-alone grid can be operated during a construction of a wind farm, in particular before the wind farm is connected to the power supply grid. Also, a stand-alone grid can emerge after a blackout (blackout), when a lower voltage limit is not met for duration that is too long. If a wind farm or another set of participants is disconnected from the power supply grid, this stand-alone grid must continue to operate or its operation must be restarted again.

A stabilization controller in the stand-alone grid may in particular include an electrical storage device, in particular an electrical battery storage device, as well as an inverter and/or a generator. Storage device and/or generator can be understood as an electrical feeder. The inverter can electrically connect the storage device to the stand-alone grid. Also, a diesel generator may be provided at the stabilization controller. The stabilization controller may further have an additional load, such as a resistive load. The inverter of the stabilization controller may be controlled by a voltage control loop and/or a phase control loop described below, and may impose a frequency and/or a voltage and/or a phase onto the stand-alone grid.

According to the subject matter, the feeder is preferably connected to the stand-alone grid via the inverter. This stand-alone grid is separably connected to a supra-local utility grid. In case of a grid failure, it can be useful to disconnect the stand-alone grid from the utility grid. However, when starting up the participants (e.g., the wind farm or the solar farm), it must be ensured that the consumers within the stand-alone grid that are necessary for this start-up are supplied with sufficient electrical power. Additionally, the participants must form a stable electrical network together with the feeder and aim for a target frequency.

During the rebuilding of the stand-alone grid and/or for connection to the utility grid of the stand-alone grid, the stabilization controller provides a voltage and/or a frequency and/or a phase between current and voltage to the stand-alone grid, in particular at the busbar. The specified phase angle is not necessarily a phase angle between current and voltage, however, but can be a fixed reference phase angle for the grid. Thereby, the feeder is able to supply loads in the stand-alone grid. Also, network impedances between the busbar and a participant can be compensated. Through the imposed frequency, the participant is synchronized with the stabilization controller. The participant then feeds active power into the isolated network.

If the active power of a participant exceeds the load in the isolated network, the stabilizing controller can be operated as a load and absorb active power. It is also possible to cause the participants to absorb active power in a motor operation by means of appropriate phase control. If the already started participants together with the feeder do not supply the loads sufficiently any more, further participants can be connected. Further loads and participants are successively connected so that the stand-alone grid is transferred to/maintained in stable operation.

In order to feed active power into the stand-alone grid or to draw it as a load from the stand-alone grid, the feeder is coupled to the stand-alone grid via a stabilization controller. The feeder may have at least one electrical storage device, e.g., a battery storage device and/or a generator.

The participant are in turn coupled to the stabilization controller via the stand-alone grid. For this purpose, the lines of the participants can be brought together at one or different busbars.

In order to now ensure that the stand-alone grid can be transferred to a stable operation, in particular with a nominal frequency and a nominal active power, it is proposed that a nominal frequency for the stabilization controller and/or a nominal phase for the stabilization controller is controlled in a phase-locked loop at least as a depending on a measured grid frequency of the stand-alone grid and/or a state of charge and/or an active power of the feeder. The stabilization controller may have a phase-locked loop.

The phase-locked loop may have a nominal power, in particular an active nominal power, as a command variable. This command variable can be supplied from a voltage control loop with/without subordinate current control, in particular a d/q voltage control. An intermediate circuit voltage controller may be provided in the voltage control loop. The intermediate circuit voltage controller may be for maintaining the state of charge of the feeder. The intermediate circuit voltage controller may use a nominal voltage value and an actual voltage value of the feeder.

A deviation of the command variable from a measured actual active power value can be determined and this value can be fed to a controller, in particular to an I controller. From this, a nominal power for a participant can be determined. On the one hand, it is possible to communicate the nominal power as a frequency value or as a power value to a participant via telecontrol. On the other hand, it is also possible to use the output of the controller, in particular limited if necessary to a positive value, as a frequency component in a frequency control of the phase-locked loop.

An active and/or reactive component or a d-component and a q-component of a nominal voltage at the output of the stabilization controller can be controlled in a voltage control loop depending on a state of charge of the feeder and/or a measured grid voltage at the stabilization controller. The stabilization controller can also use a measured and a nominal mains voltage.

In order to be able to determine correct nominal voltage setpoints taking into account the grid impedance, it is proposed that an impedance between an output of the stabilization controller and a grid node of the stand-alone grid is determined, and that active and/or reactive components or a d component and a q component of a nominal voltage for the stabilization controller are controlled in the voltage control loop depending on the determined impedance.

Within the voltage control loop, a subordinate current control can be provided. In the current control, a control element can be dependent on the network impedance, in particular on the impedance between an output of the stabilization controller and a grid node. As a result, voltage feedforward control can be provided. The grid impedance can further be dependent on the reactance of the transformer of the feeder, the type of busbar, the line reactor and/or the cables between stabilization controller and/or busbar.

It is proposed that a forward connection in the voltage control loop is dependent on the determined reactance. Furthermore, the forward connection in the voltage control loop can be a crossover connection between a q-component and a d-component according to the park transformation of the controlled voltage. In principle, the control can also be implemented in other coordinates or component systems, such as those of the Clarke transformation (alpha, beta, 0) or the three components of the three-phase system (u, v, b) or the extended components according to the Park transformation (d, q, 0).

In particular, voltage control can be achieved using the control loop according to "New Control of Wind Turbines Ensuring Stable and Secure Operation Following Islanding of Wind Farms", I. Erlich et. al., IEEE 2017 may be constructed. From this voltage control for the participants, a nominal active current setpoint for the phase-locked loop can be taken over.

In particular, a difference between the nominal voltage of the feeder and the actual voltage of the feeder can be fed through a PI controller and the output can be used as a q component of a nominal current. This output can be understood as the output of an intermediate circuit voltage controller. On the one hand, the output can be used in the voltage control loop as a command variable of a subordinate current control and, on the other hand, as a command variable for a phase locked loop. By means of a corresponding conversion, a nominal active power setpoint for the feeder at the phase-locked loop can be determined from the q component of the setpoint current. Thus, a nominal active current setpoint, in particular a d component of a setpoint current from the voltage control loop can be coupled into the phase-locked loop.

It is proposed that a nominal power setpoint or a nominal frequency setpoint for the participant is output from the phase-locked loop via a communication link, or that a nominal power setpoint for the participant is output via a nominal frequency setpoint for the stabilization controller. The phase-locked loop may output a nominal power setpoint or a nominal frequency setpoint via a communication means. This setpoint can be used by an inverter or converter at the participant to set an appropriate power. Also, a frequency can be imposed onto the stand-alone grid by the stabilization controller, especially by the inverter. This allows an active power to be set at the participant.

In order to be able to set the active and reactive power depending on the grid frequency, a nominal frequency setpoint, which can be output as a controlled variable at the phase-locked loop, is fed back. The nominal frequency setpoint at the output of the phase-locked loop can be fed back to the nominal frequency setpoint for a participant. A difference therefrom can be used as a manipulated variable for the phase locked loop.

It is also proposed that a nominal phase setpoint for the stabilization controller is fed back in the phase locked loop. In particular, a coordinate transformation of the measured voltage at the inverter into a q component of the voltage can be performed using the fed-back phase.

The stabilization controller is operated while taking into account an impedance between an output of a stabilization controller and a grid node of the stand-alone grid. A grid node can be, for example, a busbar, in particular a medium-voltage busbar, at which connections of several participants of the stand-alone grid are brought together.

The impedance between the output of the stabilization controller and the grid node can be measured or calculated. The impedance can be measured once before commissioning, at intervals during operation, in particular regularly, or once during operation. The impedance can also be calculated from model parameters obtained from the data sheets of the equipment involved, such as transformers, cables, switchgear, overhead lines, etc., which are located between the stabilizing controller and the grid node.

It is also possible to couple signals with one or different frequencies at the output of the stabilizing controller and to measure the frequency response of the system. Here, for example, frequencies between 50 and 5 kHz, preferably between 50 and 2.5 kHz can be coupled in and one measurement can be made per frequency or per frequency band. Here it is possible, for example, either to couple the signals in at the stabilization controller and measure them at the grid node or the other way around, namely to couple them in at the grid node and measure them at the stabilization controller. In the latter case, a measurement signal can be coupled in at the grid node.

For the operation of the participant, the stand-alone grid is controlled with voltage as the command variable, in particular at one or the defined grid node, the nominal voltage is set. The converter of the stabilization controller is operated in such a way that destabilization tendencies resulting from the control at the wind power plants themselves are counteracted.

In particular, d/q control can be used for voltage control. The voltage coupled into from the line-side converter (LSC) at the stabilization controller is relevant for the amplitude of the stand-alone voltage and the active power. A power flow results depending on the impedance, and the voltage which affects active power is completely in the q-axis only for purely inductive grids. In offshore stand-alone grids, there is also a significant resistive component, so that the voltage component in the d-axis can also influence the active power.

The share of the injected voltage in the direction of the d-axis results from a control of the amplitude of the grid voltage. The share of the injected voltage in the q-axis results from a control of the active power (or the intermediate circuit voltage) in the network.

In this voltage control, there is an overall decoupling between the target value of the voltage and the current injection at the stabilizing controller. At least the q-portion of the voltage is indirectly set via the injected current at the stabilizing controller, thus via the active power (or via the control of the intermediate circuit voltage) at the stabilizing controller. Limitations can be introduced for the setpoints of the currents.

The impedance between the stabilizing controller and the grid node is measured in particular for a fundamental frequency. Harmonic components are preferably not taken into account. The speed of the control of the stabilization controller is preferably set in such a way that decoupling with the controller of the participant takes place. The bandwidth of the frequency response of the stabilization controller is then selected to be larger than the bandwidth of the frequency response of at least one, preferably all, inverters of the participants. In particular, the bandwidth of the stabilization controller is at least twice as large as the bandwidth of at least one inverter of the participants. This results in the decoupling in time of the two controllers.

Within the stabilization controller, attenuators may be arranged which are set to the most important natural frequencies of the system. In particular, these can be the resonant frequencies of the stand-alone grid, taking into account one or all network impedances and the inverters of the participants. The attenuators are built into the control loops in such a way that they can cause both active and reactive power changes and can thus act in both axes of the d/q voltage control.

If a diesel generator is used as the stabilizing controller, the attenuators can act via the excitation device only in one axis.

By making the bandwidth of the stabilization controller larger than the bandwidth of the inverter, preferably at least twice as large, controller oscillations between the stabilization controller and the inverter of the participants are minimized.

Controller oscillations between the inverters of the participants are minimized or suppressed by the stabilization controller acting like a stiff network with high short-circuit power due to its high bandwidth.

According to an embodiment, it is proposed that the stabilization controller comprises at least one attenuator. The stabilization controller may comprise a P, PI or PID controller. In particular, a subordinate current control may comprise a controller without an I component.

Here, the subordinate current control essentially serves to implement a current limitation so that overloads of the stabilization controller due to overcurrents can be reliably excluded. The current controllers in d- and q-axis are pure proportional controllers with a feedforward control, which sets the stationary output voltages of the controller via the network impedance (known from measurement or calculation) from the nominal current setpoints by applying Ohm's law. The proportional controllers in both axes serve only to compensate for a possible error in the determined network impedance and to improve the controller dynamics. The nominal current setpoints are determined from the output quantities of the superimposed voltage and active power controllers. Since these are voltage components, the conversion can also be performed using Ohm's law, taking into account the known network impedances and the measured voltage at the grid node.

An attenuator can be dimensioned in such a way that it is adapted to natural frequencies of the stand-alone grid. Natural frequencies can result from the grid impedances as well as the inverters of the wind power plants. Preferably, the attenuators are arranged in both controller branches, i.e. in both q- and d-branches, and thus act on both axes through active and reactive power changes.

According to an embodiment, it is proposed that an attenuator is dependent on the impedance of the stand-alone grid, in particular the impedance between the output of the stabilizing controller and the grid node. Also, the attenuator can be adapted to a transfer function of a inverter of the participant.

By means of the attenuators, it is possible to minimize or avoid controller oscillations between the stabilization controller and the participant. In particular, the different control speeds ensure that the stabilization controller acts like a stiff net with respect to the participants.

As already explained, it is proposed according to an embodiment example that the stabilization controller injects active and/or reactive power. The injected active and/or reactive power may be influenced by the attenuator.

According to an embodiment, it is proposed that the stabilizing controller is operated with a fixed frequency and, via telecontrol, an active power of the participant is changed depending on a power change at the participant. With the fixed nominal frequency of the stabilization controller, it has no relation to the power balance in the stand-alone grid. In order to be able to adjust the power balance in the stand-alone grid, a control at the participants is necessary. If there is a power fluctuation at the participant, for example due to gusts of wind or load jumps, the stabilization controller reacts briefly by changing the phase of the imposed voltage. This can reduce or increase the output power of the participant depending on the direction of the power change (also phase change). This change in output power prevents the inverter from being overloaded.

If the stabilizing controller is operated at a fixed frequency, an adjustment of the power of the participant cannot be made by adjusting the frequency. Therefore, it is necessary that a communication between the stabilization controller and the participant takes place via a telecontrol system. Within this communication, a new nominal power setpoint is transmitted to the participant so that the fixed frequency can be maintained again after a short equalization process. The adjustment of the output power at the stabilizing controller in case of a power fluctuation of the participant is occurs by, in the pointer diagram, the voltage pointer following with minimum delay the voltage pointer of the participant which leads ahead by the power increase or lags behind by a power decrease. If the voltage pointer of the participant is leading ahead, the lagging of the voltage pointer of the stabilizing controller causes a short-term increase in frequency. Conversely, if the voltage pointer lags behind, there will be a short-term frequency reduction.

It is also possible that the stabilizing controller is operated with a variable frequency. In this case, through frequency control, a communication between the participant and the stabilizing controller can be omitted. By means of frequency control, active power control is possible without communication. By means of a lead-lag compensator at the stabilizing controller, the active power output can be briefly modified to counteract the frequency change. A lead-lag compensator can also be implemented at the participant. For this purpose, when the frequency is lowered, for example, energy is briefly extracted from the inertia of the rotating component of the participant, such as the wind power plant drive train causing the speed to decrease. This briefly operates the wind power plant at a new operating point. After adjusting the pitch angle of the rotor blades, the speed is then increased again and the wind power plant returns to its optimal operating point.

As described above, active power control within the stand-alone grid is possible via communication as well as via frequency control. For active power control, a setpoint for a inverter of the participant can be determined depending on a frequency and/or a power flow at the stabilization controller. For this purpose, the setpoint can be fixed at the stabilization controller. The active power demand of the stand-alone grid can be determined either from the frequency or from the power flow at the stabilization controller, and from this the setpoints for the individual wind power plants can be determined.

To ensure that power fluctuations at the participant can be compensated by the stabilization controller, it is proposed that an output power of the participant is less than a maximum power of the stabilization controller.

It is also proposed that a load forecast is made taking into account typical load profiles of the loads. The load profiles may be dependent on environmental conditions, such as outdoor temperature for example. These load forecasts are set in the participants or specified via lookup tables. The stabilization of the stand-alone grid is then performed exclusively by the stabilization controller, since there is no communication between the stabilization controller and the participant and no frequency control is necessary. In exceptional cases, however, manual switching on and/or off of the participant is necessary, especially if the load forecast is not met.

Power fluctuations at the participant, for example caused by gusts of wind or load jumps, can be compensated by the power control of the participant. A high degree of accuracy is required here, so that power changes do not exceed the converter power of the stabilization controller, the power of the storage device and/or the power of the load at the stabilization controller. As a result, the stabilization controller is always able to compensate for power fluctuations.

According to one embodiment, the stabilization controller acts as a slack bus. Within the bounds of its current and voltage limits, the stabilization controller acts as a slack bus so that the power flow at the associated converter automatically adapts to the needs in the stand-alone grid. The stabilizing controller keeps the voltage amplitude and phase at a defined grid node stationary constant as long as it operates within its current and voltage limits. As soon as the stabilization controller runs into its current or voltage limits, it automatically limits the output power or voltage so that voltage and frequency can temporarily no longer be maintained in the stand-alone grid. The frequency and voltage control of the participants thus establishes a new operating point, allowing the stabilization controller to return to its normal operating range.

As mentioned, the power values at the participants must be adjusted quickly to avoid overloads at the stabilizing controller. The reactive power of the individual participants can be adjusted depending on the active power at the respective participant and/or the active power of the stabilizing controller. Here, a dependency between active and reactive power can be stored in a lookup table so that a reactive power can be set according to an active power.

It is also possible that the reactive power is set via a control loop at the stabilizing controller and reactive power measurement at the stabilizing controller. A setpoint specification for the respective participant can be made by communication from the stabilization controller to the participant.

The stabilizing controller is designed for the fundamental frequency of the stand-alone grid. Harmonic oscillations, which can occur during stand-alone operation, can be damped by additional filters. Active compensation and/or damping of harmonics can also be performed in the control loop of the stabilization controller.

The stabilization controller is preferably provided in a container or standard container so that it can be used in a mobile manner for the commissioning of wind farms. It can be assumed that in particular a mobile stabilization controller can be used in a variety of ways. In particular, a stabilization controller may be necessary for the commissioning of wind farms, since some wind farms, before they are connected to the grid, must already be operated in the stand-alone grid (if, for example, the grid connection is delayed), in particular to operate consumers on the wind power plants, such as air conditioners, motors, lighting and the like. The active power required for this is provided by the wind power plants, which are provided with a stable grid by the stabilization controller.

After commissioning of the wind farm, the stabilization controller can be moved to a new wind farm in the standard container. In particular, a transformer, especially a medium voltage transformer, an inverter and a storage unit may be provided in the container or the containers or standard containers. The transformer and/or the inverter may be provided for connection to the medium voltage level. Also a transformer of a diesel generator, which is provided for emergency power supply, can be used. In addition, a resistive load may be installed in the standard container to absorb power peaks.

As already explained, the stabilization controller provides a voltage and a frequency at a grid node. Such a grid node is in particular a busbar via which the wind power plants are connected. The stabilization controller supplies loads and compensates the reactive power demand, for the cable capacitances and/or transformer inductances. The cable capacitance to a first wind power plant can be compensated by the stabilization controller if the cable network is not compensated by compensation coils.

In the case of the start-up, the stabilization controller provides the voltage and frequency and powers the loads necessary for start-up. The first wind power plant is synchronized with the frequency of the stand-alone grid and injects active power. To enable the wind power plant to deliver a technical minimum active power, the stabilization controller serves as a load. After an first wind power plant has been started up, additional loads and wind power plants are added as loads. By switching on the loads, the active power of the wind power plant as well as of the storage device can become too low, so that soon the next wind power plant is switched to generator operation, synchronizes with the stand-alone grid and injects active power. Even then, excessive active power injected is absorbed again by the stabilization controller. In this way, step by step all wind power plants of a wind farm can be put into operation and feed their minimum active power into the stand-alone grid.

BRIEF DESCRIPTION OF THE DRAWINGS

In the following, the subject matter is explained in more detail by means of a drawing showing exemplary embodiments. In the drawing show.

DETAILED DESCRIPTION OF THE INVENTION

Figure 1:
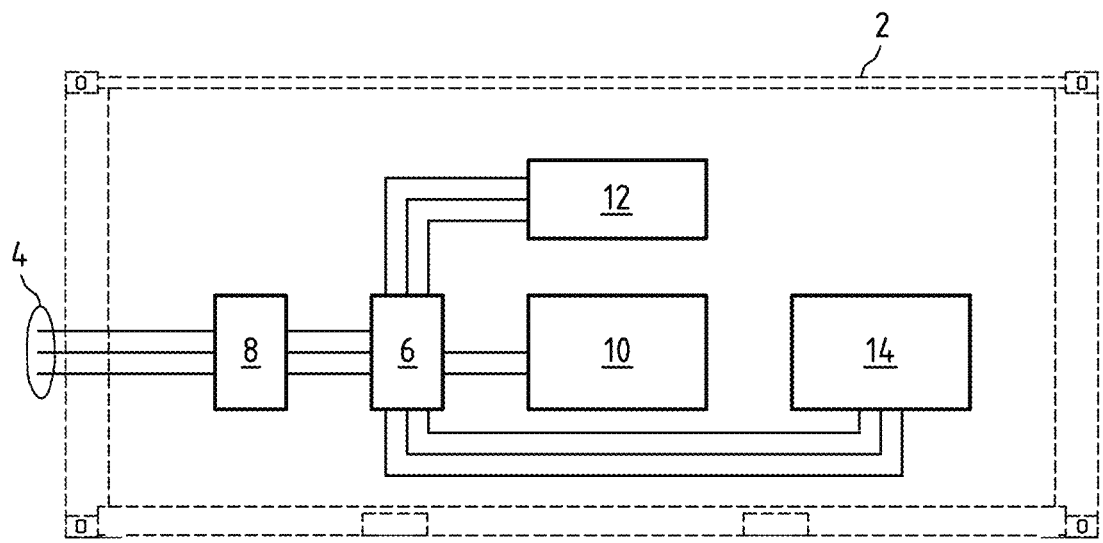
FIG. 1 is a standard container with a stabilization controller according to the subject matter.

FIG. 1 shows a standard container 2, for example a 20, 30 or 40 feet long container. The container 2 is connected to a distribution network, in particular in a wind farm, via a connection 4. The connection 4 is in particular a connection in the medium voltage level at a voltage level of 20 kV, 33 kV or 66 kV. A stabilization controller 6 is connected to the connection 4. A control algorithm for an inverter, which is also part of the stabilization controller 6, is provided in the stabilization controller 6.

The stabilization controller 6 is connected to the connection 4 via an optional transformer 8, for example a medium voltage transformer.

On the other side, the stabilization controller 6 is connected to a battery storage device 10 and a resistive load 12. The load 12 may be separately switchable. The load 12 may be connected in parallel with the battery storage with the stabilization controller 6.

In addition to the storage device 10, a generator 14 may be provided. The generator 14 can be used to charge the energy storage 10 and to bridge periods with a generation deficit (e.g. due to long wind lull). The load 12 can be connected on the three-phase side between the inverter and the transformer 8.

The generator 14 may also be directly connected with the stabilization controller 6. The described components can all be arranged jointly completely or at least partially within the container 2.

Figure 2:
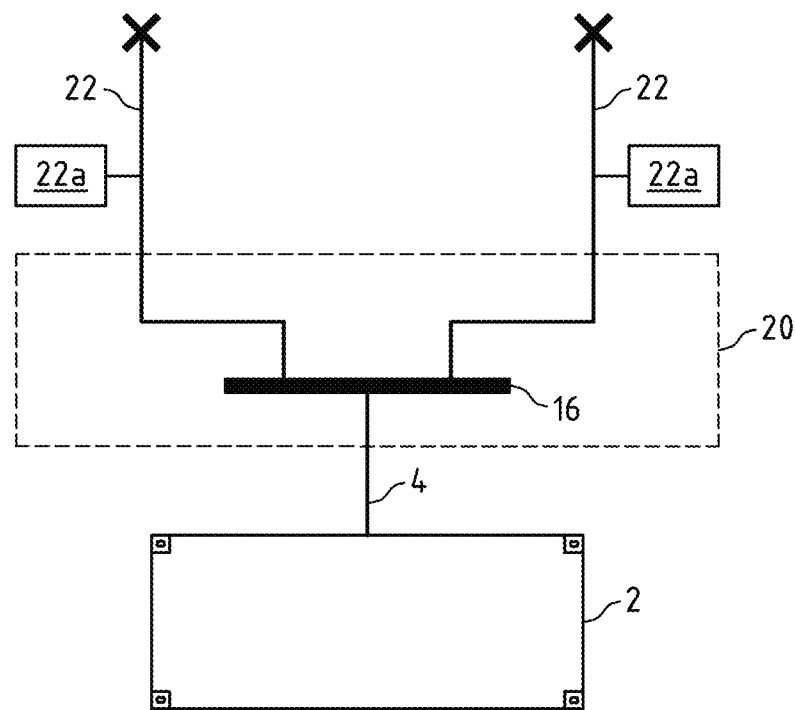
FIG. 2 is a wind farm with participants, which are connected to a stabilizing controller via a busbar.

FIG. 2 shows the container 2 connected with the terminal 4 to a busbar 16 within an stand-alone grid 20. The stand-alone grid 20 is formed in parts by the stabilization controller 6 and the busbar 16 as well as wind power plants 22 connected thereto. Each of the wind power plants 22 has a generator with a load 22a connected to it. The wind power plants 22 are also interconnected through the busbar 16. For stand-alone operation, the stabilization controller 6 is operated while taking into account the impedance between the connection 4 and the busbar 16 so that it can perform voltage control.

The impedance is considered differently depending on the implementation variant. In the case of direct voltage control without subordinate current control, the impedance is taken into account in the voltage limitation of the controller, in this case the voltage limit results from the product of the permissible maximum current and the impedance, whereby an indirect current limitation is realized. In the case of a subordinate current control, the impedance is first required for the conversion of nominal voltage setpoints into nominal current setpoints, as described above, and then used in the current control in the feedforward control.

The following explanations are purely exemplary. Any elements of the control loops can be replaced or omitted as required. The elements can be combined in any way.

Figure 3:
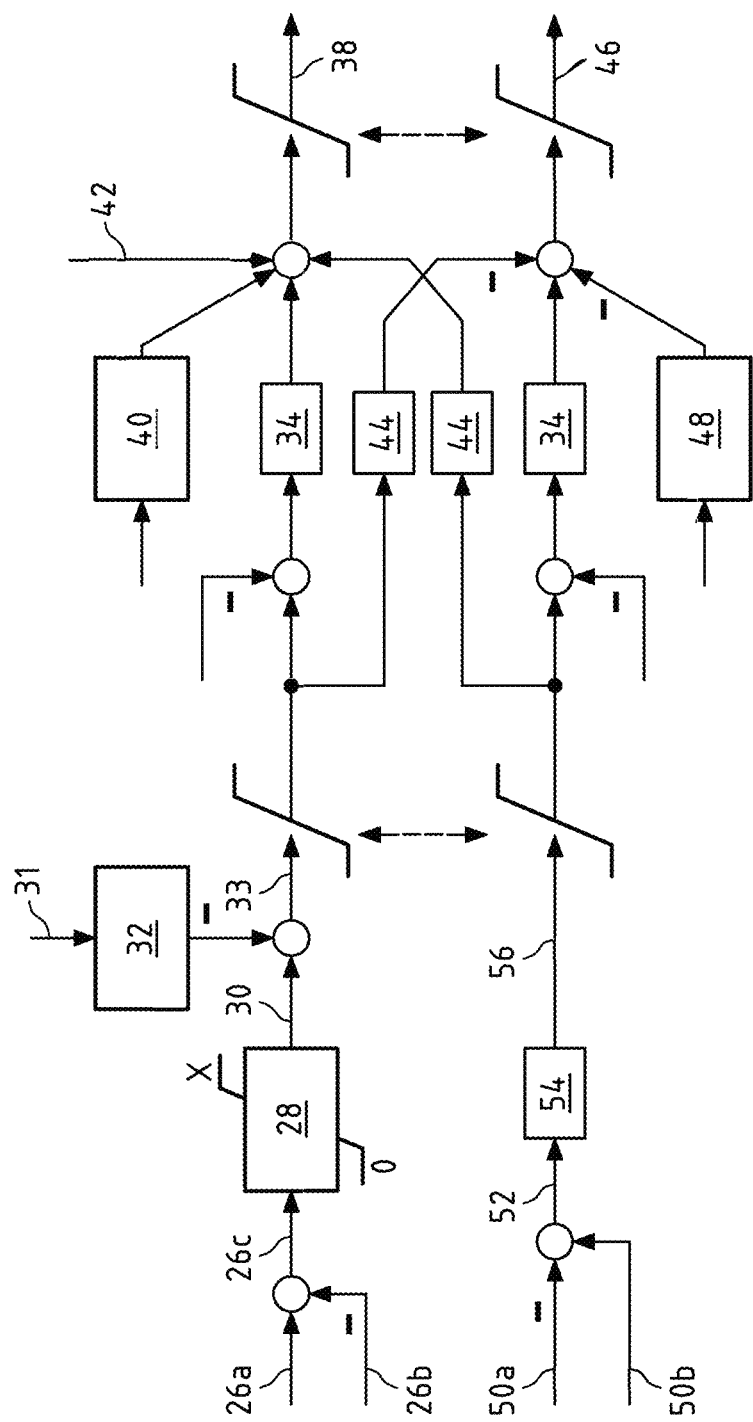
FIG. 3 is a voltage control loop according to an embodiment.

FIG. 3 shows a voltage control of the stabilizing controller 6 as d/q control.

A reference voltage 26a and a measured voltage 26b are fed in as command variables. The reference voltage 26a results from the need for the storage device 12 to have a minimum state of charge. The measured voltage 26b can be measured at the output of the storage device 12.

The differential value 26c is fed to a control element, such as a PI controller 28. The output value 30 may be used as the d component of a nominal current setpoint (and using the voltage as the nominal active power setpoint) in a phase-locked loop, as described below.

An attenuator 32 can be used to add a measured current component 31 d—to the component of the nominal current setpoint. The difference value can be limited in its absolute value. The resulting current reference value 33 can, on the one hand, be passed through a proportional controller 34, which is dependent on the ohmic resistance between the stabilizing controller and the busbar, and output as the d-component of the voltage 38. In this case, the d-component of the voltage 38 can also be limited in its absolute value. Further, the d-component of the voltage 38 may be compensated by an attenuator 40 and/or by a measured voltage 42.

On the other hand, the resulting current reference value 33 can be output as a component of the q component of the nominal voltage 46 via a feedforward control 44, depending on the reactance of the transformer, the busbar, the reactor and/or the line to the busbar. In this regard, the q component of the nominal voltage 46 may also be limited in its absolute value. Further, the q component of the nominal voltage 46 may be compensated by an attenuator 48.

The stabilizing controller 6 can have a measured mains voltage 50a and a nominal value of the mains voltage 50b as further reference variables. A differential value 52 may be fed through a proportional controller 54. A resulting voltage value 56 can be limited.

On the one hand, the resulting q component of the nominal current 56 can be routed via a proportional controller 34, which is dependent on the ohmic resistance between the stabilizing controller and the busbar, and output as the q component of the nominal voltage 46. In this case, the q component of the nominal voltage 46 can also be limited in its absolute value. Furthermore, the q component of the nominal voltage 46 can be compensated via an attenuator 48.

On the other hand, the resulting current reference value 56 can be output via a feedforward control 44 as a component of the d component of the nominal voltage 38 depending on the reactance of the transformer, the busbar, the reactor and/or the line to the busbar.

The feedforward controls 44 can be understood as forward connections in the voltage control loop. These are cross-connected with the d and q components of the current control.

Figure 4:
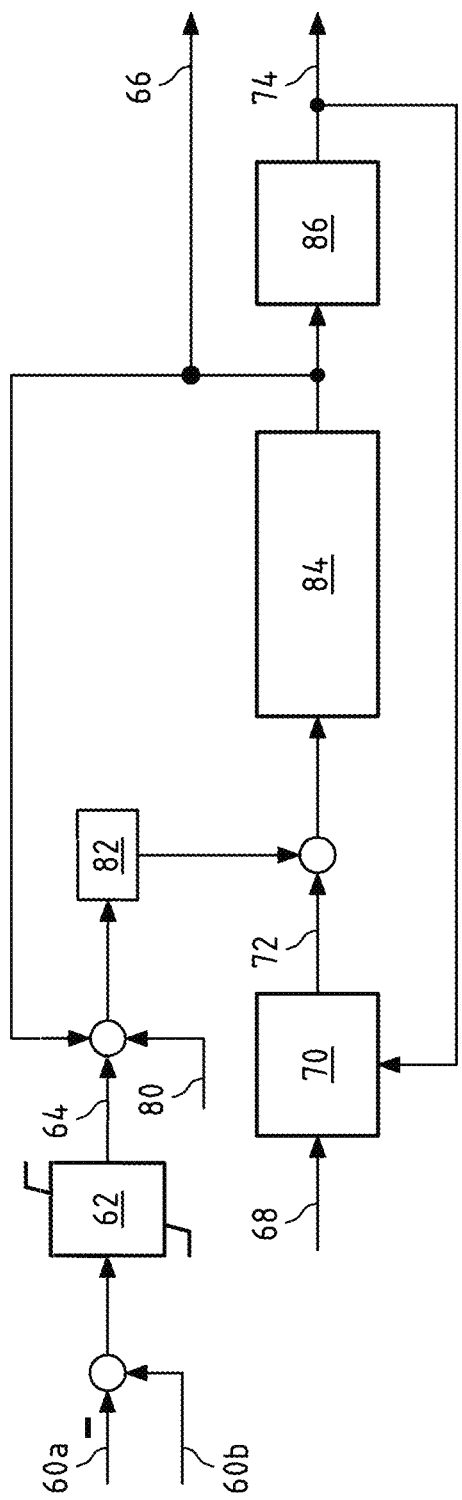
FIG. 4 is a phase-locked loop according to an embodiment.

The d component of the nominal current 30 can be fed to a phase-locked loop as shown in FIG. 4 as the nominal active power 60a using a nominal voltage.

A difference value of the nominal active power 60a and an actual active power 60b at the feeder can be fed through a limiting I controller 62 with a maximum nominal frequency of the stand-alone grid. The output can be used, on the one hand, as an additional component of a frequency control system, as shown, or it can be communicated to the participants via a telecontrol. The nominal frequency 64 can also be understood as a nominal power setpoint for the participant.

A nominal frequency component 64 may be determined from a difference between the nominal active power 60a and an actual active power 60b via the controller 62. If the output of the controller 62 is limited, for example between 0 and a maximum deviation of the frequency, the frequency component can be used for power limit of the participants.

A nominal frequency 66 is subtracted from a reference frequency 80. A q component of the voltage is determined from the difference via a factor 82, which is fed to a measured q component of the voltage 72. If too much active power is present at the feeder, through the nominal frequency component 64 can be supplied accordingly via the controller 62.

The phase-locked loop can have as a command variable a measured mains voltage 68, which is transformed in block 70 into a coordinate system rotating with the mains frequency. This results in the q-component 72 of the measured voltage. The coordinate transformation 70 is supplied from the reference phase 74 and the measured mains voltage 68.

A PI controller 84 can be used to determine the nominal frequency 66 and another I controller 86 is used to determine a nominal phase 74.

The described phase control loop as well as the described voltage control loop is purely exemplary.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for starting up a stand-alone grid with at least two participants comprising:
coupling an electrical feeder, in particular an electrical storage device and/or a generator, with the stand-alone grid having the at least two participants via a stabilization controller, wherein the stabilization controller has an ohmic load; and
coupling at least one of the participants of the at least two participants with the stabilization controller,
wherein:
a nominal frequency setpoint for the stabilization controller is controlled in a phase-locked loop at least depending on a measured grid frequency of the stand alone grid and/or state of charge and/or an active power of the feeder; and/or
a nominal phase setpoint for the stabilization controller is controlled in a phase-locked loop at least depending on a measured grid frequency of the stand-alone grid and/or a state of charge and/or an active power of the feeder,
wherein the stabilization controller is operated as a load and absorbs active power when the active power of a participant exceeds the load in the stand-alone grid and, in the case of start-up, excessive active power injected is absorbed by the stabilization controller, and
wherein first, a first participant is started-up and is synchronized with a grid frequency and injects active power into the stand-alone grid and after the first participant is started-up, additional loads and participants are connected to the stand-alone grid as loads.

2. The method of claim 1,
wherein active component and/or reactive component of a nominal voltage at an output of the stabilization controller is controlled in a voltage control loop depending on a state of charge of the feeder and/or a measured grid voltage at the stabilization controller.

3. The method of claim 1,
wherein an impedance between an output of the stabilization controller and a grid node of the stand-alone grid is determined,
the active and/or reactive components of the nominal voltage for the stabilization controller are controlled in the voltage control loop depending on the determined impedance.

4. The method of claim 3,
wherein a forward connection in the voltage control loop is dependent on the determined impedance.

5. The method of claim 2,
wherein a nominal active current setpoint of a nominal current from the voltage control loop is coupled into the phase-locked loop.

6. The method of claim 1,
wherein a nominal power setpoint for the participant is output from the phase-locked loop via a communication link, or wherein a nominal power setpoint for the participant is output from the phase-locked loop via the nominal frequency setpoint for the stabilization controller.

7. The method of claim 1,
wherein in the phase-locked loop, the nominal frequency setpoint for the stabilization controller is fed back and/or wherein in the phase-locked loop, the nominal phase setpoint for the stabilization controller is fed back.

8. The method of claim 1,
wherein a first nominal frequency setpoint is determined in the phase-locked loop from the difference between an actual power value at the feeder and a nominal power setpoint at the feeder, and wherein a difference between the first nominal frequency setpoint and the fed-back frequency setpoint is determined for the stabilization controller.

9. The method of claim 3,
wherein the impedance is measured for a fundamental frequency.

10. The method of claim 1,
wherein a bandwidth of a frequency response of the stabilization controller is larger than a bandwidth of a frequency response of an inverter of the at least one of the participants coupled with the stabilization controller.

11. A method for starting up a stand-alone grid with at least two participants comprising:
coupling an electrical feeder, in particular an electrical storage device and/or a generator, with the stand-alone grid via a stabilization controller, wherein the stabilization controller has an ohmic load; and
coupling at least one of the participants with the stabilization controller,
wherein:
a nominal frequency setpoint for the stabilization controller is controlled in a phase-locked loop at least depending on a measured grid frequency of the stand alone grid and/or state of charge and/or an active power of the feeder; and/or
a nominal phase setpoint for the stabilization controller is controlled in a phase-locked loop at least depending on a measured grid frequency of the stand-alone grid and/or a state of charge and/or an active power of the feeder,
wherein the stabilization controller is operated as a load and absorbs active power when the active power of a participant exceeds the load in the stand-alone grid;
wherein first, a first participant is started-up and is synchronized with a grid frequency and injects active power into the stand-alone grid and after the first participant is started-up, additional loads and participants are connected to the stand-alone grid as loads;
wherein an impedance between an output of the stabilization controller and a grid node of the stand-alone grid is determined;
the active and/or reactive components of the nominal voltage for the stabilization controller are controlled in the voltage control loop depending on the determined impedance; and
wherein the stabilization controller comprises at least one attenuator, and that the attenuator is dependent on the impedance and/or a natural frequency of the stand-alone grid and/or a transfer function of an inverter of the participant, wherein the attenuator stabilizes the stabilization controller.

12. The method of claim 11,
wherein the stabilization controller injects active or reactive power depending on the attenuator.

13. The method of claim 1,
wherein a power balance of the stabilization controller and the participant is controlled by power measurement at the participant and communication between the participant and the stabilization controller.

14. The method of claim 1,
wherein the stabilization controller is frequency-controlled, wherein the stabilization controller has a lead-lag compensator.

15. The method of claim 14,
wherein the lead-lag compensator modifies an active power output at the stabilization controller in such a way that it counteracts the frequency change.

16. The method of claim 1,
wherein an output power of the at least one of the participants coupled with the stabilization controller is lower than a maximum power of the stabilization controller.

17. The method of claim 1,
wherein the stabilization controller is operated as a slack bus.

18. The method of claim 1,
wherein a reactive power of the participant is set depending on an active power of the participant and/or an active power of the stabilization controller, in particular wherein a dependency between active and reactive power is stored in a look-up table.

19. A stabilization controller for carrying out the method of claim 1,
wherein the stabilization controller is installed at least in part together with a medium-voltage transformer and an electrical energy storage device in a container and has the ohmic load;

wherein the stabilization controller couples an electrical feeder, in particular an electrical storage device and/or a generator, with the stand-alone grid having the at least two participants;

wherein at least one of the participants of the at least two participants is coupled with the stabilization controller;

wherein a phase-locked loop is arranged within the stabilization controller, the phase-locked loop being arranged to control:
- a nominal frequency setpoint for the stabilization controller at least depending on a measured grid frequency of the stand-alone grid and/or a state of charge and/or an active power of the feeder; and/or
- a nominal phase setpoint for the stabilization controller at least depending on a measured grid frequency of the stand-alone grid and/or a state of charge and/or an active power of the feeder;

wherein the stabilization controller is arranged to operate as a load and to absorb active power when the active power of a participant exceeds the load in the stand-alone grid and, in the case of start-up, excessive active power injected is absorbed by the stabilization controller; and wherein the stabilization controller initially starts up a first participant and synchronizes the first participant with a grid frequency to inject active power into the stand-alone grid, and after the first participant is started-up, the stabilization controller connects additional loads and participants to the stand-alone grid as loads.

20. The method of claim 1, wherein each of the at least two participants are selected from a group consisting of a wind power plant, a photovoltaic plant, a biogas plant, and a CHP plant; and wherein the electrical feeder comprises a battery storage device connected to a generator, the generator being configured to charge the battery storage device during periods of generation deficits of the stand-alone grid.

* * * * *